United States Patent
Stewart

[19]

[11] Patent Number: 5,833,259
[45] Date of Patent: Nov. 10, 1998

[54] TWO WHEELED VEHICLE FORK WITH REINFORCED LEG

[75] Inventor: Gerald M. Stewart, Simi Valley, Calif.

[73] Assignee: Answer Products, Inc., Valencia, Calif.

[21] Appl. No.: 545,208

[22] Filed: Oct. 19, 1995

[51] Int. Cl.$^6$ .................................................. B62K 25/08
[52] U.S. Cl. ............................................ 280/276; 280/279
[58] Field of Search .................................. 280/275, 276, 280/277, 279, 280, 274

[56] References Cited

U.S. PATENT DOCUMENTS

| 545,948 | 9/1895 | De Lany | 280/280 |
|---|---|---|---|
| 4,138,132 | 2/1979 | Doyle | 280/279 |
| 5,445,401 | 8/1995 | Bradbury | 280/276 |
| 5,509,675 | 4/1996 | Barnett | 280/276 |
| 5,653,007 | 8/1997 | Boyer et al. | 280/276 |

*Primary Examiner*—Brian L. Johnson
*Assistant Examiner*—Avraham Lerner
*Attorney, Agent, or Firm*—Thomas I. Rozsa; Tony D. Chen

[57] ABSTRACT

A new and improved two wheeled vehicle suspension fork with reinforced legs. The reinforcement is provided to the upper inner tube of a telescoping assembly utilized in the suspension fork. The inner tube has an upper end portion for attachment to the crown. The upper end portion has an enlarged outer dimension for reinforcing the upper inner tube at the crown attachment.

39 Claims, 10 Drawing Sheets

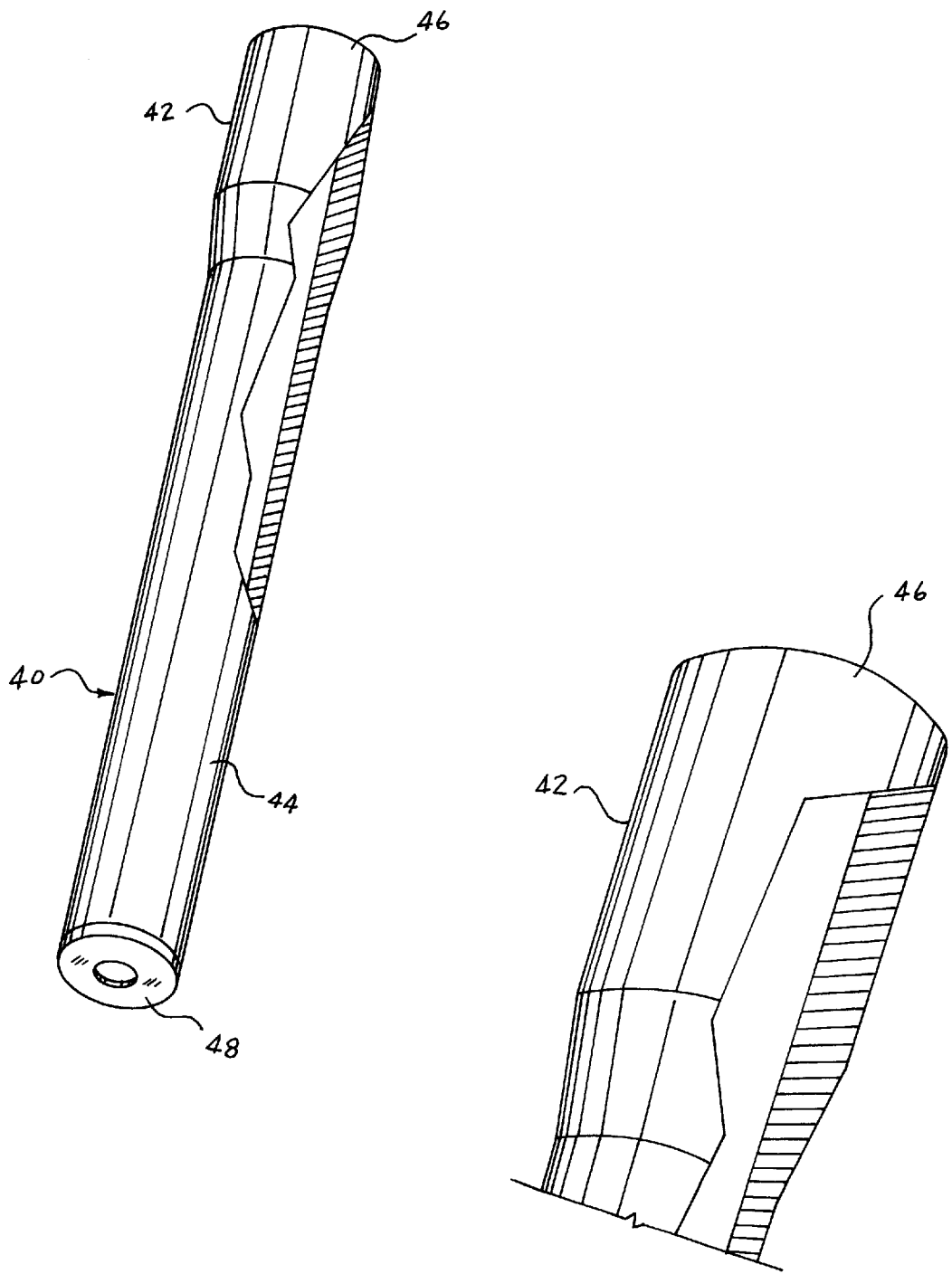

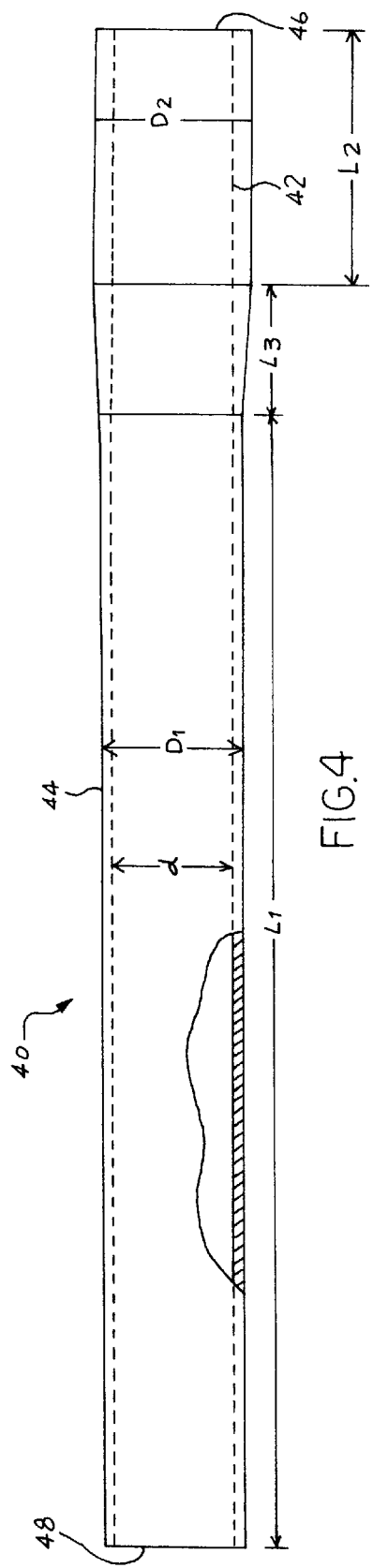
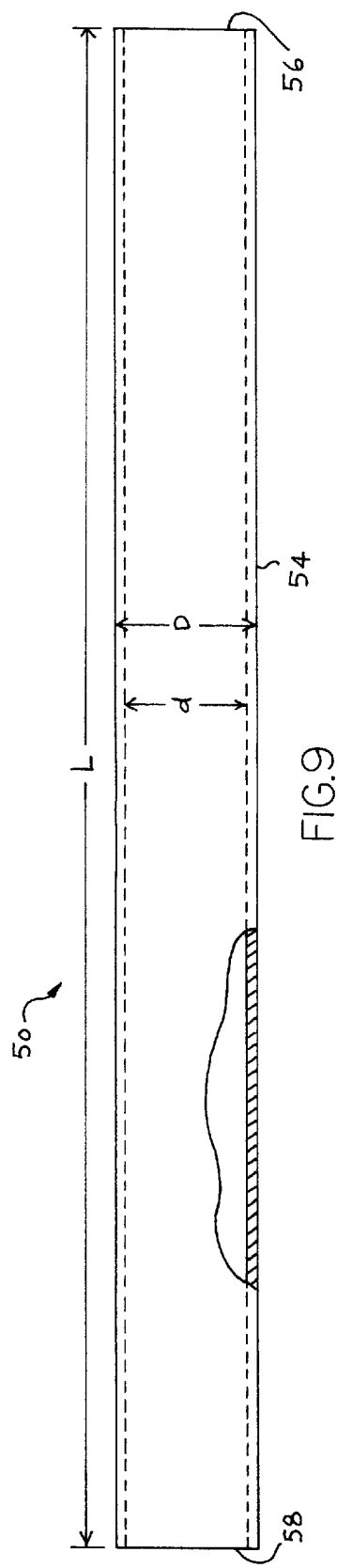

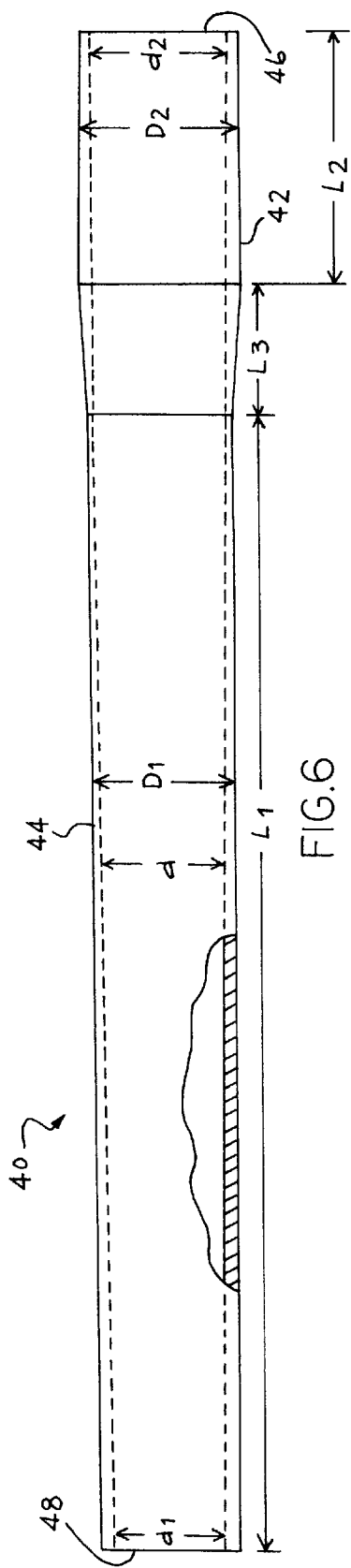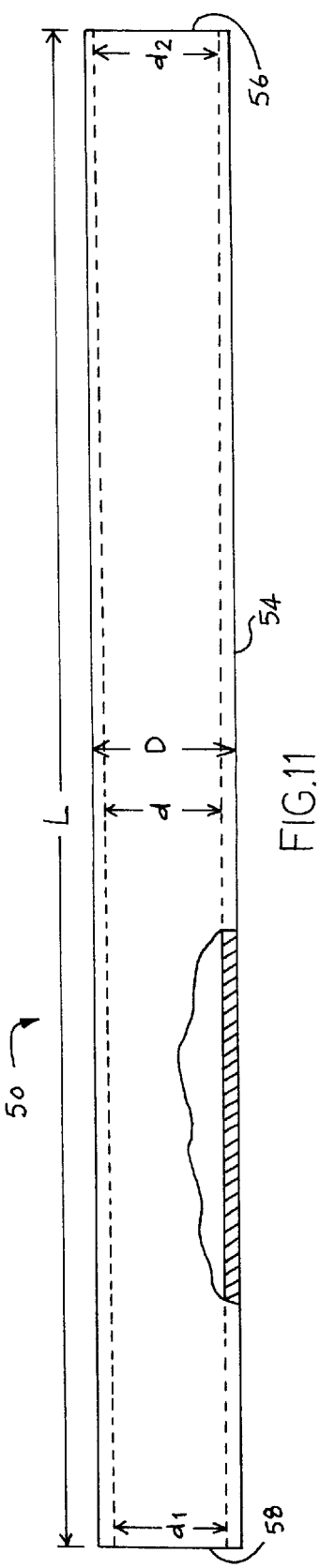

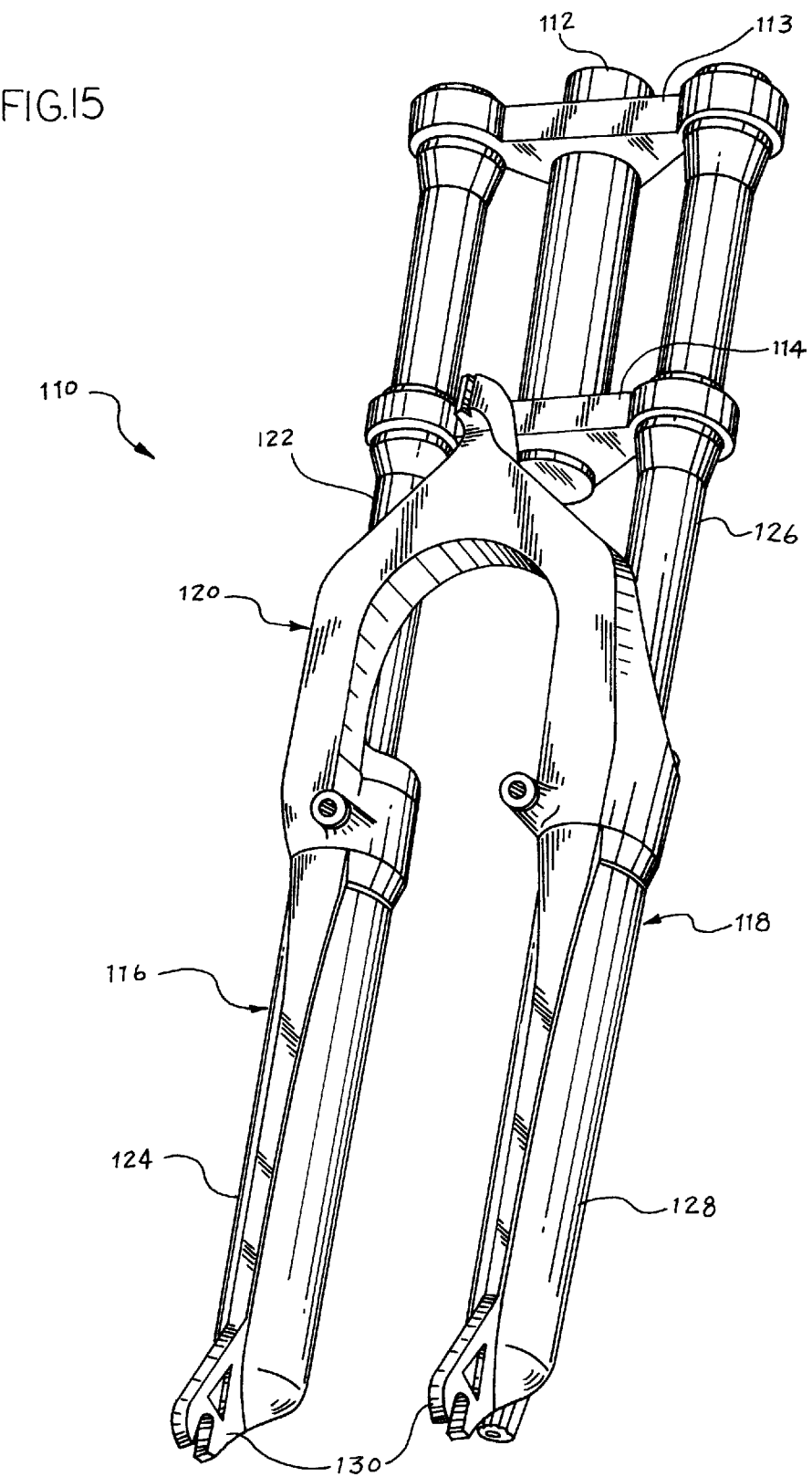

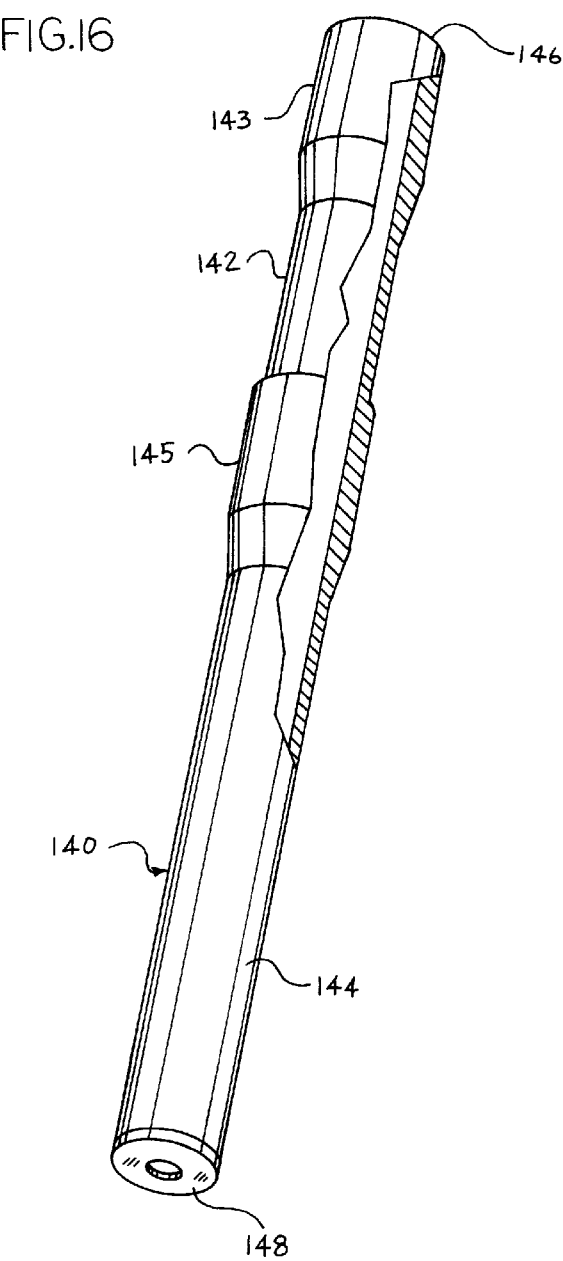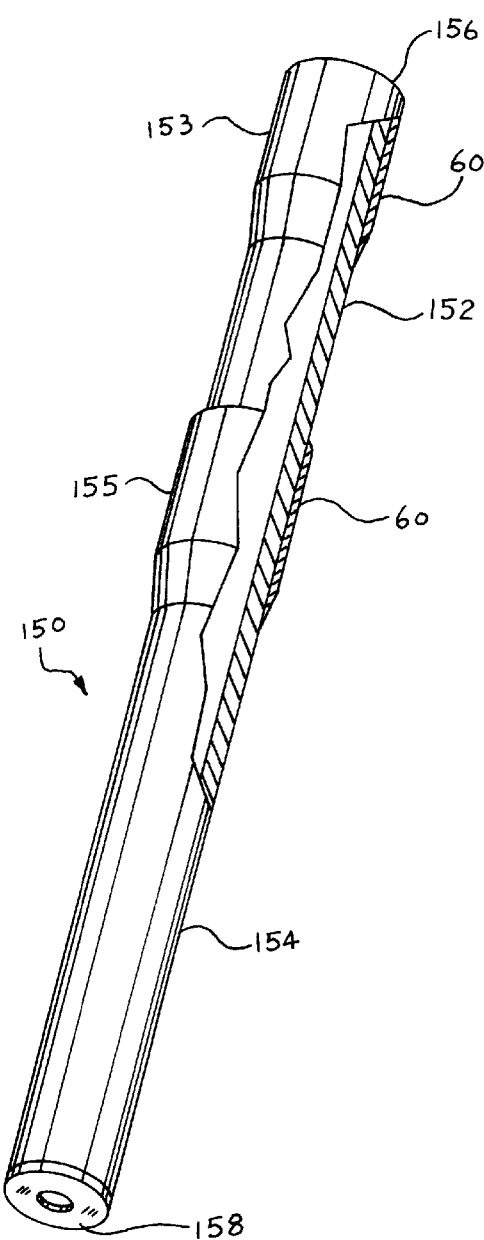

TWO WHEELED VEHICLE FORK WITH REINFORCED LEG

BACKGROUND OF THE INVENTION

1. Field of The Invention

The present invention relates to the field of design and construction of two wheeled vehicle frames such as bicycle and motorcycle frames. More particularly, the present invention relates to the field of design and construction of the inner tube for front suspension forks for two wheeled vehicles such as bicycles and motorcycles.

2. Description of The Prior Art

A front fork for a two wheeled vehicle such as a motorcycle or bicycle typically includes the following main components: a steering tube, a crown, and two front legs. The steering tube is connected to the handlebar. The crown interconnects the steering tube and the two front legs.

Many bicycle or motorcycle fork legs now utilize various suspension systems. Commonly a suspension leg utilizes a telescoping assembly which includes an upper tube and a lower tube. The upper and lower tubes are slidably engaged with damping devices to form a suspension leg. The crown is connected to the top ends of the upper tubes.

One problem encountered in design and construction of the telescoping assembly is the strength of the tubes. The tubes are constantly subject to the weight, torsional and side loading forces from the handlebar (through the steering tube and the crown) and the front wheel axle. This is a particular concern for the inner tubes which is necessarily thinner than the outer tubes in the telescoping assembly.

For example, in a telescoping assembly where the upper tube is slidably inserted into the lower tube, the upper tube is the inner tube and the lower tube is the outer tube of the telescoping assembly. The lower part of the inner tube is inserted and travels within the outer tube, but the upper part of the inner tube stays outside of the outer tube and is exposed. Therefore, while the lower part of the inner tube is braced and bolstered by the outer tube, the upper part of the inner tube is not supported by the outer tube. Moreover, since the top end of the inner tube is connected to the crown, it further bears the stress from the handlebar.

Therefore, it is desirable to provide reinforcement to the legs of a bicycle or motorcycle forks. Particularly, it is desirable to provide reinforcement at the top ends of the legs where the crown is connected. More particularly, it is desirable to reinforce the exposed part of the inner tubes of the telescoping assemblies at the location where the inner tube is attached to the crown.

SUMMARY OF THE INVENTION

The present invention is a new two wheeled vehicle fork with reinforced legs.

An object of the present invention is to provide reinforcement to the legs of the wheel forks of a two wheeled vehicle such as a motorcycle or bicycle. Particularly, the reinforcement is provided at the top ends of the legs where the crown is connected. More particularly, the reinforcement is provided at the exposed part of the inner tubes of the telescoping assemblies at the location where the crown is connected.

Described generally, the present invention is a reinforced inner tube for the suspension fork of a two wheeled vehicle such as a motorcycle or a bicycle. The suspension fork includes a telescoping assembly connected to the crown. The reinforced inner tube is part of the telescoping assembly. The reinforced inner tube has an elongated hollow tubular main section for slidable engagement with the outer tube of the telescoping assembly, two opposite ends, and an end portion adjacent to one end for attachment to the crown. The end portion of the inner tube has an enlarged outer dimension for reinforcing the inner tube at such end portion. This enlargement is compared to the lower part of the tube which is slidably engaged with the outer tube of the telescoping assembly. The enlarged end portion can be either an integral part of the tube or formed by mounting a sleeve thereon.

A novel feature of the present invention is that it reinforces the strength and durability of the front legs by increasing the outer diameter of the inner tube at the end where the crown is attached. This increases the strength of the leg at the critical crown-leg interface.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 2 is a perspective view with partial cut-out view of a present invention reinforced inner tube.

FIG. 3 is an enlarged view showing the reinforced top end of the inner tube.

FIG. 4 is a side-view with partial cut-out view of one embodiment of the present invention reinforced inner tube.

FIG. 6 is a side view with partial cut-out view of still another embodiment of the present invention reinforced inner tube.

FIG. 9 is a side view with partial cut-out view of one embodiment of the alternative inner tube.

FIG. 11 is a side view with partial cut-out view of still another embodiment of the alternative inner tube.

FIG. 15 is a perspective view of an alternative bicycle front suspension fork which utilizes the present invention.

FIG. 16 is a perspective view with partial cut-out view of an embodiment of the reinforced tube utilized in the alternative bicycle front suspension fork shown in FIG. 15.

FIG. 17 is a perspective view with partial cut-out view of an alternative embodiment of the reinforced tube utilized in the alternative bicycle front suspension fork shown in FIG. 15.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The drawings in the following description will concentrate on describing specifically a bicycle version of a two wheeled vehicle. However, it is emphasized that the principles of the present invention are equally applicable to other two wheeled vehicles such as motorcycles. Therefore, while a discussion of a bicycle front fork will be set forth in the following detailed description of the preferred embodiment, it is emphasized that the same discussion is applicable to motorcycle front forks and the principles outlined in the detailed description of the preferred embodiment as well as the claims apply to motorcycles suspension fork assemblies in addition to bicycle suspension fork assemblies.

Figure 1:
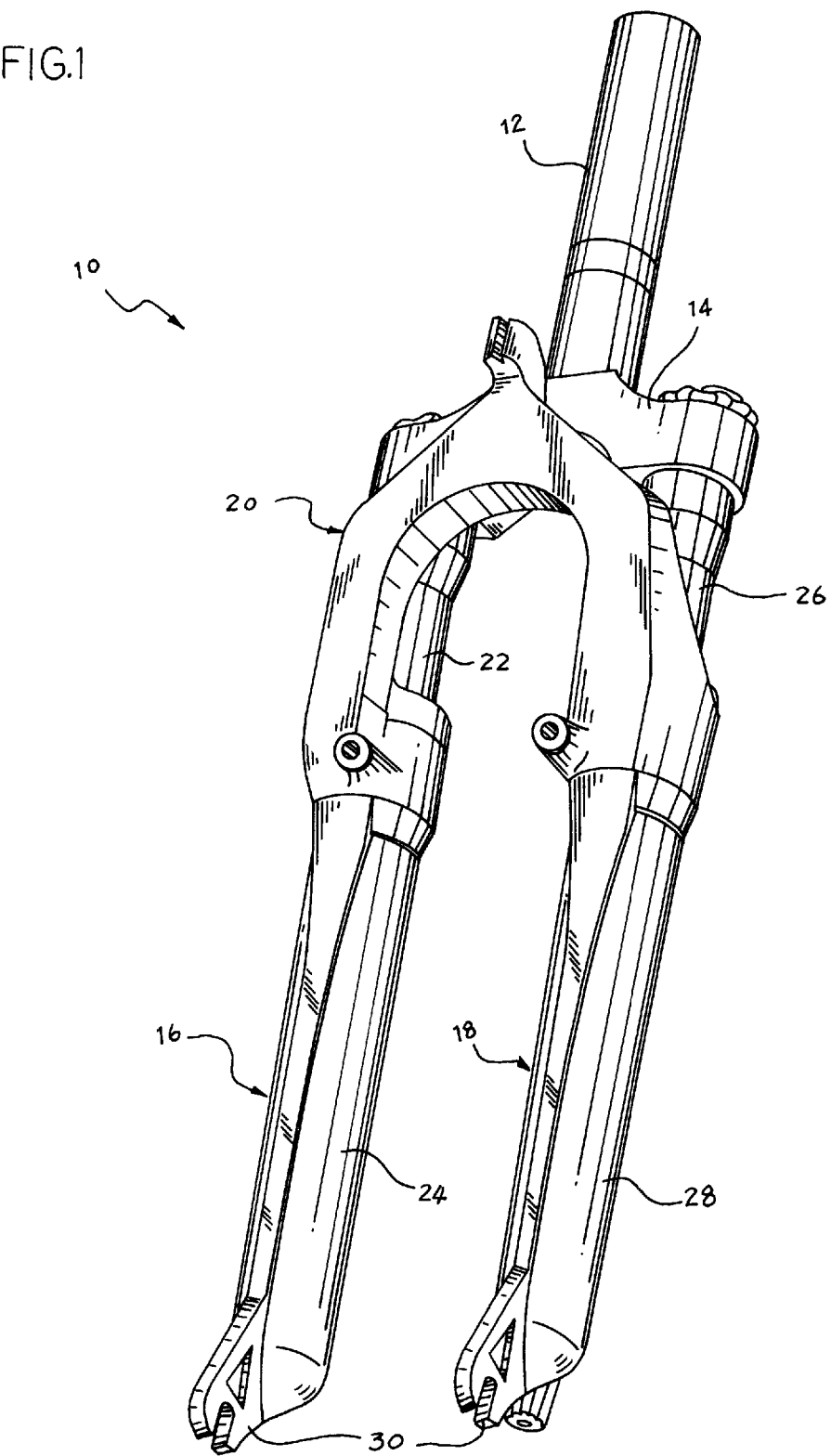
FIG. 1 is a perspective view of a bicycle front suspension fork which utilizes the present invention.

Referring to FIG. 1, there is shown at 10 a bicycle suspension fork of the present invention. The fork 10 is to be mounted between a frame part, typically the handlebars (not shown in the drawing), and a wheel axle, typically front wheel axle (not shown in the drawing), of a bicycle. The main components of fork 10 include a steering tube 12, a crown 14, two parallel fork legs 16 and 18, and a brake arch 20. The fork legs 16 and 18 each has a telescoping suspension system. The telescoping suspension system of leg 16 includes an upper tube 22 and a lower tube 24, where the upper tube 22 is an inner tube slidably inserted into the lower tube 24 which is an outer tube. Similarly, the telescoping suspension system of leg 18 also includes an upper tube 26 and a lower tube 28, where the upper tube 26 is an inner tube slidably inserted into the lower tube 28 which is an outer tube. The upper tubes 22 and 26 are attached to the crown 14, and the lower tubes 24 and 28 each have a respective dropout 30 for mounting onto the front wheel axle (not shown in the drawing).

Referring to FIGS. 2 and 3, there is shown one embodiment 40 of the reinforced inner tubes 22 and 26 of the present invention. Reinforced tube 40 has an end portion 42 for attachment to the crown 14, an elongated hollow tubular main section 44, and two opposite ends 46 and 48. The elongated main section 44 is for slidable engagement with the outer tube 24 or 28 of the telescoping assembly and has a uniform outer dimension. The most noticeable feature of the tube 40 is that its end portion 42 has an enlarged outer dimension which is greater than the uniform outer dimension of the elongated main section 44. This enlarged portion 42 is integrally formed with the tube 40.

This enlarged outer dimension of the end portion 42 is one of the novel feature of the present invention. Since the crown 14 is to be attached to the end portion 42, this enlarged dimension increases the strength of the tube 40 at this critical interface, thereby enhancing the strength and durability of the overall fork.

Figure 5:
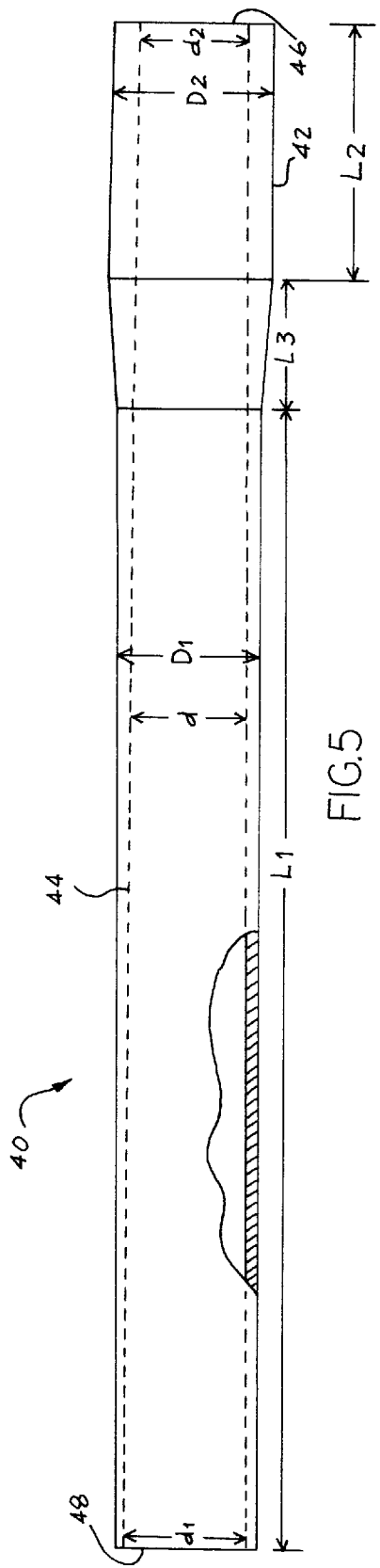
FIG. 5 is a side view with partial cut-out view of still another embodiment of the present invention reinforced inner tube.

Referring to FIGS. 4, 5 and 6, there are shown various embodiments of the reinforced inner tube 40. The cross-sectional outer diameter of the elongated main section 44 is D1, and the cross-sectional outer diameter of the end portion section 42 is D2. It can be seen that D1<D2. At the conjunction between the elongated main section 44 and the enlarged end portion section 42, the outer diameter of the tube is gradually reduced from D2 to D1. This is the common feature of all these various embodiments. However, the cross-sectional inner diameter d of these embodiments varies, which results in different sidewall configurations.

In FIG. 4, there is shown a straight sidewall configuration. The cross-sectional inner diameter d of the tube 40 remains the same throughout its entire length. On the other hand, FIGS. 5 and 6 show tapered sidewall configurations. The cross-sectional inner diameter d of the tube 40 varies. In the drawings, the cross-sectional inner diameter at end 48 is designated as d1, and the cross-sectional inner diameter at end 46 is designated as d2.

In FIG. 5, the sidewall is tapered from the end 46 toward the opposite end 48 (d1>d2). However, in FIG. 6, the sidewall is tapered from the end 48 toward the end 46 (d1<d2). The tapering of the sidewall serves the purpose of reducing the weight of the tube, while strengthening the tube at the location where it is subject to higher stress. In addition, different tapering configurations suit different applications.

Figure 4A:
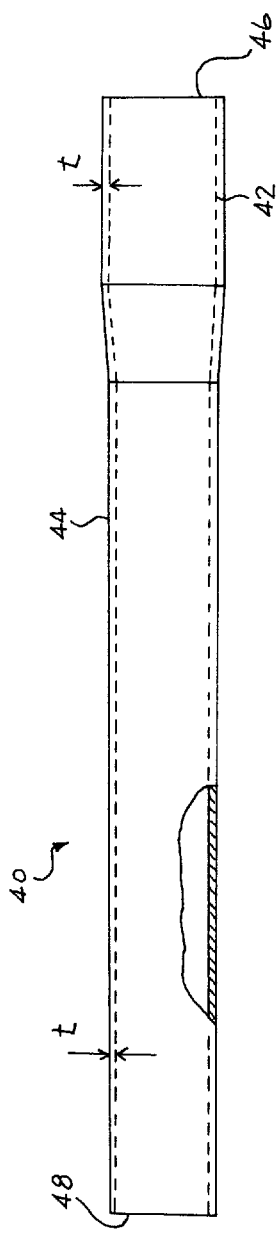
FIG. 4A is a side view with partial cut-out view of another embodiment of the present invention reinforced inner tube.

In FIG. 4A, there is shown different sidewall configuration. The thickness t of the sidewall of the tube 40 remains the same throughout its entire length, including the enlarged end portion 42.

Figures 7, 8:
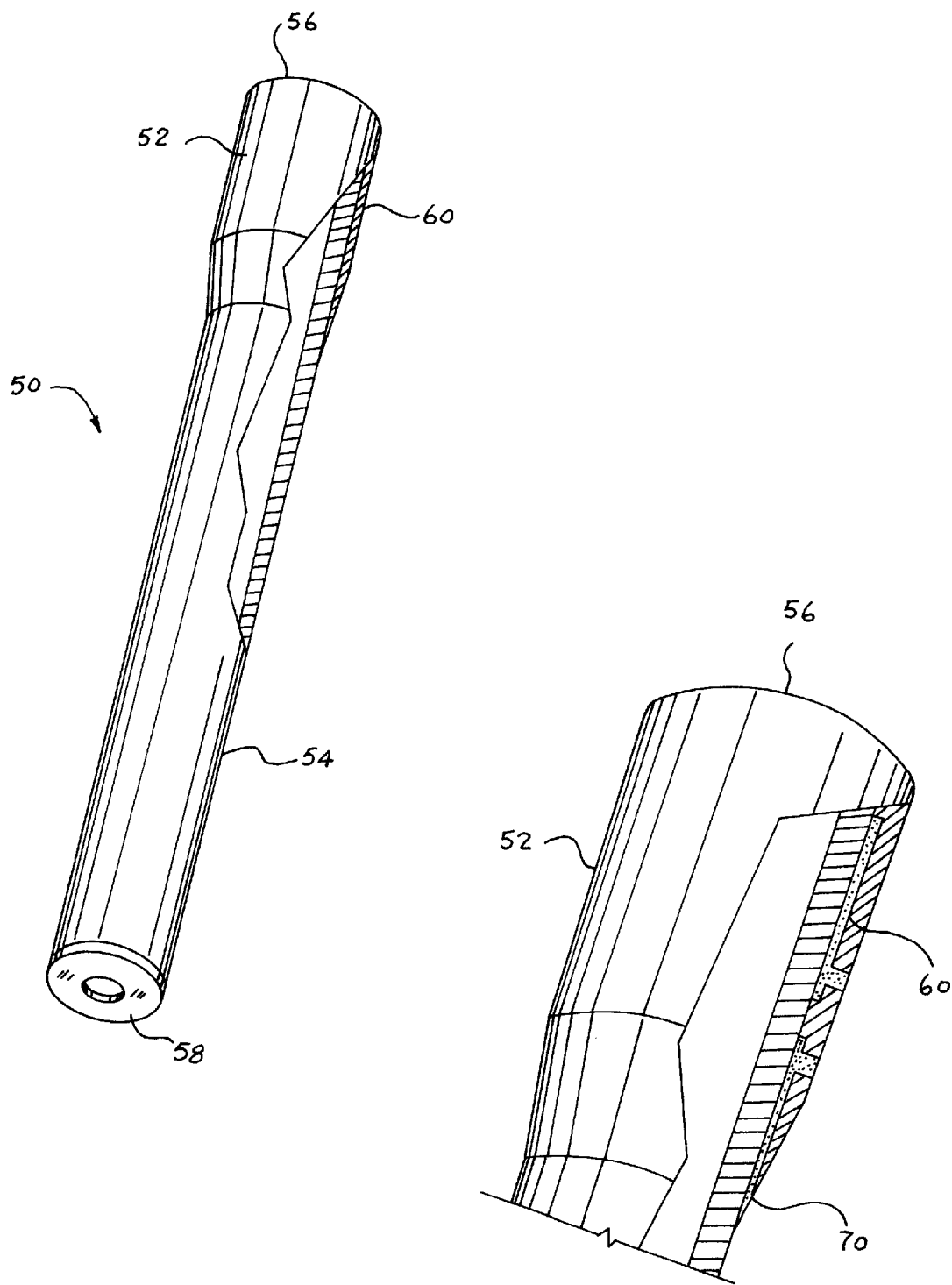
FIG. 7 is a perspective view with partial cut-out view of an alternative embodiment of the present invention reinforced inner tube.
FIG. 8 is an enlarged view showing the reinforced top end of the inner tube of the alternative embodiment of the present invention.

Referring to FIGS. 7 and 8, there is shown an alternative embodiment 50 of the reinforced inner tubes 22 and 24 of the present invention. Reinforced tube 50 has an end portion 52 for attachment to the crown 14, an elongated hollow tubular main section 54, and two opposite ends 56 and 58. Again, the elongated main section 54 is for slidable engagement with the outer tube 24 or 28 of the telescoping assembly and has a uniform outer dimension. The most noticeable feature of the tube 50 is that its end portion 52 has an enlarged outer dimension which is greater than the uniform outer dimension of the elongated main section 54. However, in this alternative embodiment, this enlarged portion 52 is formed by mounting a separate sleeve 60 to the tube 50.

Figure 10:
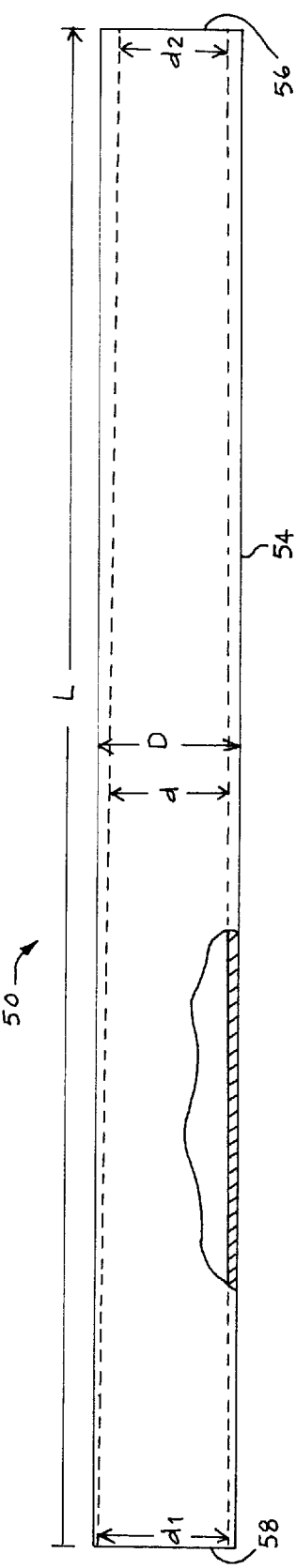
FIG. 10 is a side view with partial cut-out view of another embodiment of the alternative inner tube.

Referring to FIGS. 9, 10 and 11, there are shown various configurations of the alternative embodiment 50. The cross-sectional outer diameter D of the tube 50 now remains unchanged throughout its entire length L. However, the cross-sectional inner diameter d of these embodiments varies, which again results in different sidewall configurations.

In FIG. 9, there is shown a straight sidewall configuration. The cross-sectional inner diameter d of the tube 50 remains the same throughout its entire length. On the other hand, FIGS. 10 and 11 show tapered sidewall configurations. In FIG. 10, the sidewall is tapered from the end 56 toward the opposite end 58 (d1>d2). However, in FIG. 11, the sidewall is tapered from the end 58 toward the end 56 (d1<d2). These arrangements are similar to those depicted in FIGS. 4, 5 and 6.

Figure 12:
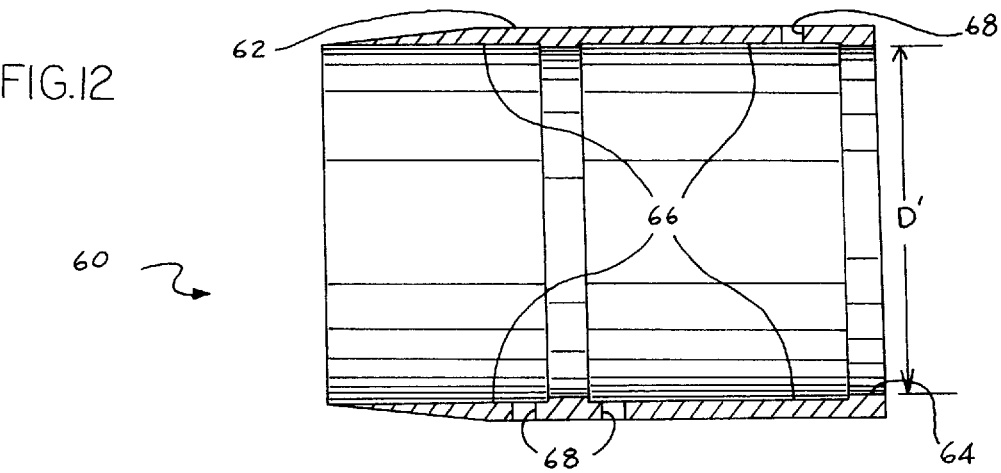
FIG. 12 is a cross-sectional view of the sleeve utilized in the alternative embodiments of the present invention.
Figure 13:
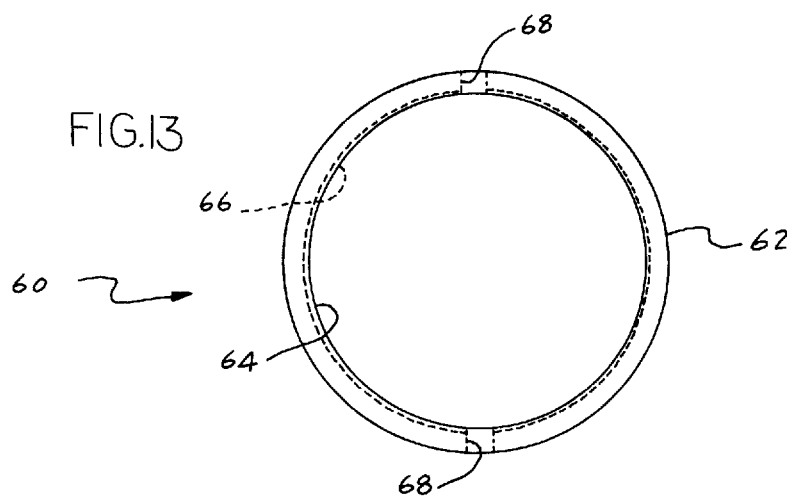
FIG. 13 is an end view of the sleeve utilized in the alternative embodiments of the present invention.

Referring to FIGS. 12 and 13, there is depicted the sleeve 60 utilized in the alternative embodiments of the present invention. The exterior surface 62 of the sleeve 60 has a similar configuration as the integral enlarged end portion 42 shown in FIG. 3. The sleeve 60 has an inner diameter D' which is equal to slightly larger than the outer diameter D of tube 50 for tight fit. The interior surface 64 of the sleeve 60 has one or more recessed areas 66 for accommodating the bonding material. The sleeve 60 also has small holes 68 which open into the recessed areas 66 for injection of the bonding material.

Figure 14:
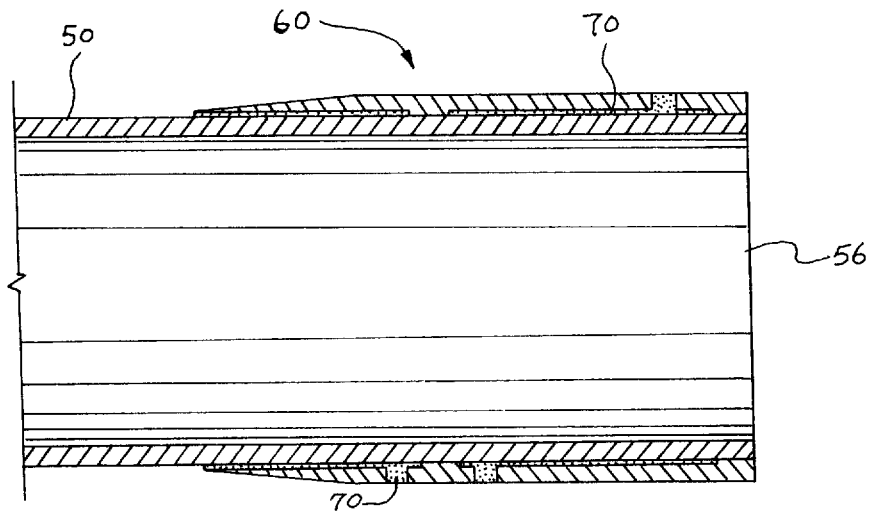
FIG. 14 is a cross-sectional view showing the bonding of sleeve and the tube for the alternative embodiments of the present invention.

FIG. 14 shows how sleeve 60 is mounted to tube 50. Sleeve 60 is placed over tube 50 and bonded thereon by structural adhesive 70.

Referring to FIG. 15, there is shown at 110 an alternative bicycle suspension fork of the present invention. The fork 110 is to be mounted between a frame part, typically the handlebars (not shown in the drawing), and a wheel axle, typically front wheel axle (not shown in the drawing), of a bicycle. The main components of fork 110 include a steering tube 112, an upper crown 113 and a lower crown 114, two parallel fork legs 116 and 118, and a brake arch 120. This is a double-crown embodiment of the suspension fork which is commonly utilized for increasing the clamping strength between the steering bar 112 and the two legs 116 and 118. The fork legs 116 and 118 each has a telescoping suspension system. The telescoping suspension system of leg 116 includes an upper tube 122 and a lower tube 124, where the upper tube 122 is an inner tube slidably inserted into the lower tube 124 which is an outer tube. Similarly, the telescoping suspension system of leg 118 also includes an upper tube 126 and a lower tube 128, where the upper tube 126 is an inner tube slidably inserted into the lower tube 128 which is an outer tube. The upper tubes 122 and 126 are attached to the crown 113 and 114, and the lower tubes 124 and 128 each have a respective dropout 130 for mounting onto the front wheel axle (not shown in the drawing).

Referring to FIG. 16, there is shown one embodiment 140 of the reinforced inner tubes 122 and 126 of the present invention. Reinforced tube 140 has an extended upper section 142, an upper end portion 143 and a middle end portion 145 for attachment to the two crown 113 and 114 respectively, an elongated hollow tubular main section 144, and two opposite ends 146 and 148. The elongated main section 144 is for slidable engagement with the outer tube 124 or 128 of the telescoping assembly and has a uniform outer dimension. The most noticeable feature of the tube 140 is that its two end portions 143 and 145 have enlarged outer dimensions which are greater than the uniform outer dimension of the elongated main section 144. The outer dimension of the extended upper section 142 may be the same as that of the enlarged end portions 143 and 145, or may be reduced, as shown in FIG. 16, to be smaller than that of the enlarged end portions 143 and 145 to reduce the weight of the inner tube 140. In this embodiment, the enlarged portions 143 and 145 are integrally formed with the tube 140.

Referring to FIG. 17, there is shown another embodiment 150 of the reinforced inner tubes 122 and 126 of the present invention. Reinforced tube 150 has an extended upper section 152, an upper end portion 153 and a middle end portion 155 for attachment to the two crown 113 and 114 respectively, an elongated hollow tubular main section 154, and two opposite ends 156 and 158. The elongated main section 154 is for slidable engagement with the outer tube 124 or 128 of the telescoping assembly and has a uniform outer dimension. Again, the most noticeable feature of the tube 150 is that its two end portions 153 and 155 have enlarged outer dimensions which are greater than the uniform outer dimension of the elongated main section 154. The outer dimension of the extended upper section 152 may be the same as that of the enlarged end portions 153 and 155, or may be reduced, as shown in FIG. 17, to be smaller than that of the enlarged end portions 153 and 155 to reduce the weight of the inner tube 150. However, in this embodiment, the enlarged portions 153 and 155 are formed by mounting separate sleeves 60 to the tube 150. The detailed configuration of sleeves 60 is shown in FIGS. 12 and 13. Sleeves 60 are bonded to tube 150 by, preferably, structural adhesive such as epoxy.

In the embodiment shown in FIG. 16, the two enlarged end portions 143 and 145 are integrally formed with the tube 140. In the embodiment shown in FIG. 17, the two enlarged end portions 153 and 155 are formed by separate sleeves 60. However, there maybe other embodiments where the integral enlarged portion and the sleeve are utilized in combination in one inner tube. One such example is shown in FIG. 18.

Figure 18:
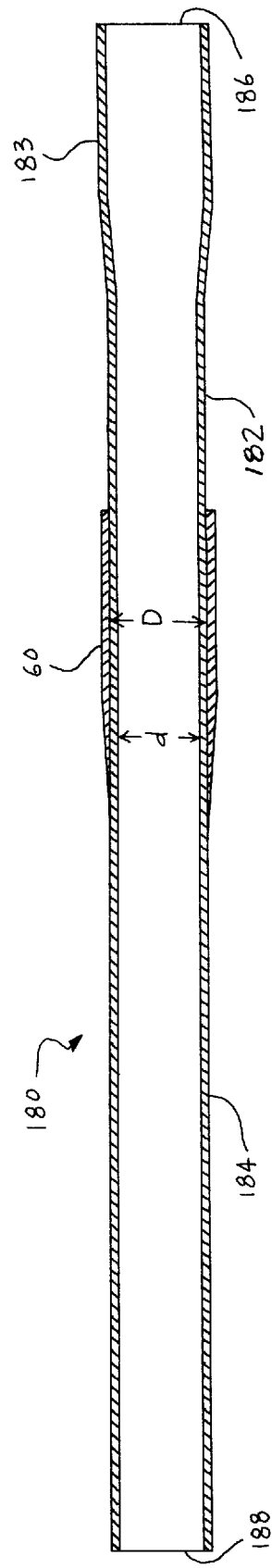
FIG. 18 is a cross-sectional view of another alternative embodiment of the reinforced tube utilized in the alternative bicycle front suspension fork shown in FIG. 15.

Referring to FIG. 18, there is shown a reinforced inner tube 180. Reinforced inner tube 180 has an extended upper section 182, an upper end portion 183 which is integrally formed with the tube 180 and a middle end portion which is formed by bonding a separate sleeve 60 to the tube 180, for attachment to the two crown 113 and 114 respectively, an elongated hollow tubular main section 184, and two opposite ends 186 and 188. It is noted that tube 180 is only one of the examples of the inner tubes which have one enlarged end portion integrally formed with the tube, and the other enlarged end portions formed by mounting a separate sleeve to the tube.

It is emphasized that although two enlarged end portions are shown in FIGS. 15 through 18, the inner tube may have only one enlarged end portion for attachment of either the upper or lower crown, and the other end portion may have a regular dimension which is the same as the outer dimension of the elongated main section or the extended upper section.

As an example, the tubes and sleeve described in this invention may be aluminum or any other suitable structural materials, and the structural adhesive may be epoxy or any other suitable structural adhesives.

The main advantage of the present invention include is that it provides the desired reinforcement to the legs of a bicycle front fork. Particularly, it provides reinforcement at the top ends of the legs where the crown is connected by increasing the outer dimension of the attachment portion of the tube. More particularly, it provides reinforcement to the exposed part of the inner tubes of the telescoping assemblies by varying the sidewall thickness.

Defined in detail, the present invention is an upper inner tube of a telescoping assembly utilized in a two wheeled vehicle suspension fork, where the telescoping assembly is connected to a crown of the suspension fork and further includes a lower outer tube slidably engaged with the upper inner tube, the upper inner tube comprising: (a) an upper end and a lower end; (b) an elongated hollow tubular main section having a uniform outer diameter for slidable engagement with the lower outer tube of the telescoping assembly; (c) an upper end portion adjacent to the upper end for attachment to the crown of the suspension fork and having an enlarged outer diameter which is greater than the uniform outer diameter of the elongated hollow tubular main section; and (d) the enlarged end portion being an integral part of the upper inner tube.

Defined alternatively in detail, the present invention is an upper inner tube of a telescoping assembly utilized in a two wheeled vehicle suspension fork, where the telescoping assembly is connected to a crown of the suspension fork and further includes a lower outer tube slidably engaged with the upper inner tube, the upper inner tube comprising: (a) an upper end and a lower end; (b) an elongated hollow tubular main section having a uniform outer diameter for slidable engagement with the lower outer tube of the telescoping assembly; (c) an upper end portion adjacent to the upper end for attachment to the crown of the suspension fork and having an enlarged outer diameter which is greater than the uniform outer diameter of the elongated hollow tubular main section; and (d) the enlarged end portion being formed by mounting a separate sleeve to the tube.

Defined also alternatively in detail, the present invention is an upper inner tube of a telescoping assembly utilized in a two wheeled vehicle suspension fork, where the telescoping assembly is connected to an upper crown and a lower crown of the suspension fork and further includes a lower outer tube slidably engaged with the upper inner tube, the upper inner tube comprising: (a) an upper end and a lower end; (b) an elongated hollow tubular main section having a uniform outer diameter for slidable engagement with the lower outer tube of the telescoping assembly; (c) an extended upper section; (d) an upper end portion adjacent to the upper end for attachment to the upper crown of the suspension fork and having an enlarged outer diameter which is greater than the uniform outer diameter of the elongated hollow tubular main section; and (e) a middle end portion located between the extended upper section and the elongated main section for attachment to the lower crown of the suspension fork and also having an enlarged outer diameter which is greater than the uniform outer diameter of the elongated hollow tubular main section.

Alternatively defined broadly, the present invention is an upper inner tube of a telescoping assembly utilized in a two wheeled vehicle suspension fork, where the telescoping assembly is connected to an upper crown and a lower crown of the suspension fork and further includes a lower outer tube slidably engaged with the upper inner tube, the upper inner tube comprising: (a) an upper end and a lower end; (b) an elongated hollow tubular main section having a uniform outer diameter for slidable engagement with the lower outer tube of the telescoping assembly; (c) an extended upper section; (d) an upper end portion adjacent to the upper end for attachment to the upper crown of the suspension fork; (e) a middle end portion located between the extended upper section and the elongated main section for attachment to the lower crown of the suspension fork; and (f) at least one of the upper end portion and the middle end portion having an enlarged outer diameter which is greater than the uniform outer diameter of the elongated hollow tubular main section.

Defined more broadly, the present invention is an upper inner tube of a telescoping assembly utilized in a two wheeled vehicle suspension fork, where the telescoping assembly is connected to at least one steering connection member of the suspension fork and further includes a lower outer tube slidably engaged with the upper inner tube, the upper inner tube comprising: (a) an upper end and a lower end; (b) an elongated main section having a uniform outer dimension for slidable engagement with the lower outer tube of the telescoping assembly; and (c) at least one upper portion for attachment to the at least one steering connection member of the suspension fork and having an enlarged outer dimension which is greater than the uniform outer dimension of the elongated main section.

The present invention has been described in detail for bicycles as set forth above. However, the present invention can be used with motorcycles or other two wheeled vehicles.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An upper inner tube of a telescoping assembly utilized in a two wheeled vehicle suspension fork, where said telescoping assembly is connected to an upper crown and a lower crown of said suspension fork and further includes a lower outer tube slidably engaged with said upper inner tube, said upper inner tube comprising:

a. an upper end and a lower end;
   b. an elongated hollow tubular main section having a uniform outer diameter for slidable engagement with said lower outer tube of said telescoping assembly;
   c. an extended upper section;
   d. an upper end portion adjacent to said upper end for attachment to said upper crown of said suspension fork and having an enlarged outer diameter which is greater than said uniform outer diameter of said elongated hollow tubular main section; and
   e. a middle end portion located between said extended upper section and said elongated main section for attachment to said lower crown of said suspension fork and also having an enlarged outer diameter which is greater than said uniform outer diameter of said elongated hollow tubular main section.

2. The upper inner tube as defined in claim 1 wherein said upper end portion and said middle end portion are two integral parts of said upper inner tube.

3. The upper inner tube as defined in claim 1 wherein said upper end portion and said middle end portion are formed by mounting two separate sleeves to said upper inner tube.

4. The upper inner tube as defined in claim 3 wherein said separate sleeves are mounted to said upper inner tube by a structural adhesive.

5. The upper inner tube as defined in claim 1 wherein one of said upper end portion and said middle end portion is an integral part of said upper inner tube, and said other one of said upper end portion and said middle end portion is formed by mounting a separate sleeve to said upper inner tube.

6. The upper inner tube as defined in claim 1 wherein said elongated hollow tubular main section has a straight interior sidewall.

7. The upper inner tube as defined in claim 1 wherein said elongated hollow tubular main section has a tapered interior sidewall.

8. The upper inner tube as defined in claim 7 wherein said tapered interior sidewall is tapered from said enlarged upper end portion toward said lower end.

9. The upper inner tube as defined in claim 7 wherein said tapered interior sidewall is tapered from said lower end toward said enlarged upper end portion.

10. The upper inner tube as defined in claim 1 where said upper inner tube has a uniform sidewall thickness throughout its entire length.

11. An upper inner tube of a telescoping assembly utilized in a two wheeled vehicle suspension fork, where the telescoping assembly is connected to a crown of the suspension fork and further includes a lower outer tube slidably engaged with the upper inner tube, the upper inner tube comprising:
   a. an upper end and a lower end;
   b. an elongated hollow tubular main portion having a uniform outer diameter for slidable engagement with said lower outer tube of said telescoping assembly;
   c. an upper end portion adjacent to said upper end for attachment to said crown of said suspension fork and having an enlarged outer diameter which is greater than said uniform outer diameter of said elongated tubular main portion;
   d. said enlarged end portion being an integral part of said upper inner tube; and,
   e. said upper tube having a uniform thickness throughout its entire length.

12. The upper inner tube as defined in claim 11 wherein said elongated hollow tubular main section has a straight interior sidewall.

13. The upper inner tube as defined in claim 11 wherein said elongated hollow tubular main section has a tapered interior sidewall.

14. The upper inner tube as defined in claim 13 wherein said tapered interior sidewall is tapered from said enlarged upper end portion toward said lower end.

15. The upper inner tube as defined in claim 13 wherein said tapered interior sidewall is tapered from said lower end toward said enlarged upper end portion.

16. An upper inner tube of a telescoping assembly utilized in a two wheeled vehicle suspension fork, where said telescoping assembly is connected to a crown of said suspension fork and further includes a lower outer tube slidably engaged with said upper inner tube, said upper inner tube comprising:
   a. an upper end and a lower end;
   b. an elongated hollow tubular main section having a uniform outer diameter for slidable engagement with said lower outer tube of said telescoping assembly;
   c. an upper end portion adjacent to said upper end for attachment to said crown of said suspension fork and having an enlarged outer diameter which is greater than said uniform outer diameter of said elongated hollow tubular main section;
   d. said enlarged end portion being formed by mounting a separate sleeve to said tube; and,
   e. said upper inner tube having a uniform sidewall thickness throughout its entire length.

17. The upper inner tube as defined in claim 16 wherein said separate sleeve is mounted to said upper inner tube by a structural adhesive.

18. The upper inner tube as defined in claim 17 wherein said structural adhesive is epoxy.

19. The upper inner tube as defined in claim 16 wherein said elongated hollow tubular main section has a straight interior sidewall.

20. The upper inner tube as defined in claim 16 wherein said elongated hollow tubular main section has a tapered interior sidewall.

21. The upper inner tube as defined in claim 20 wherein said tapered interior sidewall is tapered from said enlarged upper end portion toward said lower end.

22. The upper inner tube as defined in claim 20 wherein said tapered interior sidewall is tapered from said lower end toward said enlarged upper end portion.

23. An upper inner tube of a telescoping assembly utilized in a two wheeled vehicle suspension fork, where said telescoping assembly is connected to an upper crown and a lower crown of said suspension fork and further includes a lower outer tube slidably engaged with said upper inner tube, said upper inner tube comprising:
   a. an upper end and a lower end;
   b. an elongated hollow tubular main section having a uniform outer diameter for slidable engagement with said lower outer tube of said telescoping assembly;
   c. an extended upper section;
   d. an upper end portion adjacent to said upper end for attachment to said upper crown of said suspension fork;
   e. a middle end portion located between said extended upper section and said elongated main section for attachment to said lower crown of said suspension fork;
   f. at least one of said upper end portion and said middle end portion having an enlarged outer diameter which is greater than said uniform outer diameter of said elongated hollow tubular main section; and,
   g. said upper inner tube having a uniform sidewall thickness throughout its entire length.

24. The upper inner tube as defined in claim 23 wherein said upper end portion and said middle end portion are two integral parts of said upper inner tube.

25. The upper inner tube as defined in claim 23 wherein said upper end portion and said middle end portion are formed by mounting two separate sleeves to said upper inner tube.

26. The upper inner tube as defined in claim 25 wherein said separate sleeves are mounted to said upper inner tube by a structural adhesive.

27. The upper inner tube as defined in claim 23 wherein one of said upper end portion and said middle end portion is an integral part of said upper inner tube, and said other one of said upper end portion and said middle end portion is formed by mounting a separate sleeve to said upper inner tube.

28. The upper inner tube as defined in claim 23 wherein said elongated hollow tubular main section has a straight interior sidewall.

29. The upper inner tube as defined in claim 23 wherein said elongated hollow tubular main section has a tapered interior sidewall.

30. The upper inner tube as defined in claim 29 wherein said tapered interior sidewall is tapered from said enlarged upper end portion toward said lower end.

31. The upper inner tube as defined in claim 29 wherein said tapered interior sidewall is tapered from said lower end toward said enlarged upper end portion.

32. An upper inner tube of a telescoping assembly utilized in a two wheeled vehicle suspension fork, where said telescoping assembly is connected to at least one crown of said suspension fork and further includes a lower outer tube slidably engaged with said upper inner tube, said upper inner tube comprising:
   a. an upper end and a lower end;
   b. an elongated main section having a uniform outer dimension for slidable engagement with said lower outer tube of said telescoping assembly;

c. at least one end portion for attachment to said at least one crown of said suspension fork and having an enlarged outer dimension which is greater than said uniform outer dimension of said elongated main section; and d. said upper inner tube having a uniform sidewall thickness throughout its entire length.

33. The upper inner tube as defined in claim 32 wherein said at least one enlarged end portion is an integral part of said upper inner tube.

34. The upper inner tube as defined in claim 32 wherein said at least one enlarged end portion is formed by mounting a separate sleeve to said upper inner tube.

35. The upper inner tube as defined in claim 34 wherein said separate sleeve is bonded to said upper inner tube by a structural adhesive.

36. The upper inner tube as defined in claim 32 wherein said elongated hollow tubular main section has a straight interior sidewall.

37. The upper inner tube as defined in claim 32 wherein said elongated hollow tubular main section has a tapered interior sidewall.

38. The upper inner tube as defined in claim 37 wherein said tapered interior sidewall is tapered from said at least one enlarged end portion toward said lower end.

39. The upper inner tube as defined in claim 37 wherein said tapered interior sidewall is tapered from said lower end toward said at least one enlarged end portion.

* * * * *